(12) United States Patent
Bissonnette

(10) Patent No.: US 6,663,824 B2
(45) Date of Patent: Dec. 16, 2003

(54) METHOD AND APPARATUS FOR CUTTING STEEL TO REDUCE SLAG ADHERENCE

(75) Inventor: Claude Bissonnette, Cornwall (CA)

(73) Assignee: Oxy-Arc International, Inc., Cornwall (CA)

(*) Notice: Subject to any disclaimer, the term of this patent is extended or adjusted under 35 U.S.C. 154(b) by 0 days.

(21) Appl. No.: 09/934,701

(22) Filed: Aug. 22, 2001

(65) Prior Publication Data

US 2003/0037841 A1 Feb. 27, 2003

(51) Int. Cl.[7] .................................................. B23K 7/10
(52) U.S. Cl. ............................................. 266/77; 266/48
(58) Field of Search .............................. 266/77, 51, 56, 266/48

(56) References Cited

U.S. PATENT DOCUMENTS

| | | | | |
|---|---|---|---|---|
| 4,006,890 A | * | 2/1977 | Vainer et al. | 266/77 |
| 4,092,016 A | * | 5/1978 | Roeder | 266/77 |
| 4,336,078 A | | 6/1982 | Radtke | 148/196 |
| 4,923,527 A | | 5/1990 | Ludwigson | 148/4 R |
| 5,218,181 A | | 6/1993 | Shintani | 219/121.54 |
| 5,265,849 A | * | 11/1993 | Yamashita | 266/77 |

FOREIGN PATENT DOCUMENTS

EP 0 528 062 2/1993

OTHER PUBLICATIONS

Patent Abstracts of Japan, vol. 017, No. 123 (M–1380) Mar. 15, 1993 & JP 04 305365 A (Kobe Steel Ltd., Oct. 28, 1992 abstract.
Patent Abstracts of Japan, vol. 008, No. 186 (M–320) Aug. 25, 1984 & JP 59 076665 A (Kawasaki Seitetsu KK) May 1, 1984 abstract.
Patent Abstracts of Japan, vol. 1998, No. 02, Jan. 30, 1998 & JP 09 277003 A (Sanyo Special Steel Col Ltd), Oct. 28, 1997 abstract.
Patent Abstracts of Japan, vol. 010, No. 073 (M–463) Mar. 22, 1986 & JP 60 216976 A (Shin Nippon Seitetsu KK) Oct. 30, 1985 abstract.
Patent Abstracts of Japan, vol. 1995, No. 11, Dec. 26, 1995 & JP 07 214303 A (Tanaka Seisakusho KK) Aug. 15, 1995 abstract.

* cited by examiner

Primary Examiner—Scott Kastler
(74) Attorney, Agent, or Firm—Pearne & Gordon LLP

(57) ABSTRACT

A steel cutting apparatus includes a cutting torch that is moved in an arcuate path for guiding the cutting torch so that a cutting flame of the cutting torch is always aimed at a bottom corner of the steel at the side where the cutting process begins. Molten steel and iron oxide flow through a kerf in the steel toward the bottom corner, and drop away from the billet for collection and disposal. Only a very small amount of slag adheres to the bottom corner of the billet when cutting is complete.

15 Claims, 3 Drawing Sheets

PROIR ART

PROIR ART

METHOD AND APPARATUS FOR CUTTING STEEL TO REDUCE SLAG ADHERENCE

FIELD OF THE INVENTION

The present invention relates to a process for separation of metallurgical products, such as steel billets, blooms or small slabs, and more particularly to the cutting of these products into selected lengths, while reducing the adherence of slag on cut edges of the products.

BACKGROUND OF THE INVENTION

In a continuous casting operation, a continuous cast strand is cut into lengths, such as steel billets, using an oxygen-fuel cutting torch system. Oxygen-fuel cutting torch systems are well known and are commonly used in the cutting and welding industry. A cutting torch is mounted to move with the cast steel strand and to make a lateral separating cut through the strand perpendicular to its longitudinal axis and its direction of movement.

Conventionally, the cutting torch is positioned above and moves longitudinally together with the steel strand while being driven in a straight path transverse to the steel strand. Thus, the cutting torch flame projects downwardly and is moved horizontally across the steel strand, thereby cutting the billet. During the cutting process, the cutting torch flame produces a kerf in the steel strand. Molten steel and iron oxide flow downwardly through the kerf and drop below the billet for collection and disposal. However, some of the molten steel and iron oxide adhere to the bottom edges of the kerf and form slag beads that accumulate along those edges. This slag must be removed; otherwise it adversely affects subsequent forming operations performed on the billets, which may cause defects in finished steel products made from the billets. For example, the slag beads may adhere to roller surfaces used for steel plate forming. Since the slag beads are much harder than the steel billet, the slag beads may form dimples in the rolled steel surface, or embed in the surface. However, removing the slag beads from the billet in a secondary operation, such as scarfing, is tedious, time consuming and costly. Therefore, efforts are generally made to immediately remove the slag accumulation during the cutting process.

In general, it has been discovered, and is well known that directing a fluid stream at the molten slag as it forms on the edges of the kerf tends to blow it away and thereby reduce its adherence. The fluid stream may comprise air, oxygen, water, mixtures thereof, or other gases or liquids. U.S. Pat. No. 4,336,078, entitled PROCESS AND APPARATUS FOR THE SEPARATION OF METALLURGICAL PRODUCTS, issued to Radtke on Jun. 22, 1982, for example, describes a process and apparatus for separating metallurgical products such as ingots, slabs or plate-shaped work pieces using a cutting torch deposed on one side of the product. The cutting torch follows a prescribed cutting line and forms a front cutting edge on the surface of the product facing the cutting torch, a rear cutting edge on the opposite side of the product, and a cutting joint therebetween. At least one gaseous jet is directed at the rear cutting edge of the product to blow away molten metal and liquid slag from the rear cutting edge during the cutting process, thereby preventing the formation of slag beads at the edges of the cutting joint.

As another example of the slag adherence reduction, U.S. Pat. No. 4,923,527, entitled APPARATUS AND METHOD FOR SLAG-FREE CUTTING OF BILLETS AND THE LIKE, issued to Ludwigson on May 8, 1990, describes a billet cutting apparatus of the type, which includes an oxy-fuel cutting torch. The apparatus includes a slag removal nozzle operative simultaneously with the cutting torch to direct a jet of oxygen along the lower edge of the billet to remove slag beads tending to form thereon. The oxygen nozzle has a unique opening configuration, which provides a thin, flat oxygen stream effective over a substantial distance, such that the nozzle can be mounted laterally of the billet and outside the hostile and potentially damaging environment created by the cutting torch and the hot billet. The oxygen nozzle may be conveniently mounted in a fixed position, and in an automated billet cutting apparatus, may be attached directly to one of the billet clamping arms.

Neither of these methods has achieved wide commercial success, however. Consequently, there is still a need for alternative technologies to minimize slag bead adherence during the cutting of steel billets, and the like.

SUMMARY OF THE INVENTION

It is therefore an object of the invention to provide a method and apparatus for cutting steel with a cutting torch, while reducing slag adherence to a cut edge of the steel.

It is another object of the invention to provide a method and apparatus for cutting steel, which minimizes slag formation by moving a cutting torch in an arcuate path to reduce the area where slag can accumulate on the cut edges.

In accordance with one aspect of the present invention, a method is provided for cutting steel with a cutting torch to reduce slag adherence to a cut edge of the steel. The method comprises steps of commencing a cut at a first side of the steel, and moving the cutting torch in a arcuate path shaped to continuously aim a cutting flame at a fixed point located at a bottom of a first side of the steel, and following the arcuate path to keep the cutting flame aimed at the fixed point until the steel is cut.

When the steel has a bottom surface and an angle of the bottom corner at the first side is not greater than 90°, it is preferable to move the cutting torch from the first side of the steel to a second side which is opposite the first side, while gradually rotating the cutting torch from a first orientation perpendicular to the bottom surface, and along the arcuate path to a second orientation parallel to the bottom surface of the steel, so that the cutting flame of the cutting torch is continuously aimed at the bottom corner of the first side of the steel. The cutting torch is preferably moved transversely relative to the steel, while being maintained stationary relative to a longitudinal axis of the steel. In particular, in continuous cast cutting operations, the cutting torch is moved synchronously with the steel in a direction parallel with the longitudinal axis of the steel. Thus, the molten metal and iron oxide, under the influence of the force of the cutting flame jet, flow toward the bottom corner at the first side of the steel as the cutting torch moves along the arcuate path and the cutting flame thereby pivots across the steel. Substantially all of the molten metal and iron oxide drop off below the steel, and only a very small amount of slag bead adheres to the bottom corner of the first side of the steel, which can generally be ignored in a subsequent forming process.

In accordance with another aspect of the invention, an apparatus is provided for cutting steel to reduce slag adherence to the steel. The apparatus comprises a cutting torch and means for moving the cutting torch in an arcuate path to ensure that a cutting flame of the cutting torch is always aimed at a bottom corner of the steel.

The means for moving the cutting torch preferably comprises a track forming the arcuate path for guiding the cutting torch movement, a drive mechanism operatively connected to the cutting torch to move the cutting torch along the track, and a frame to support the track and the drive mechanism. A linkage system is preferably included in the drive mechanism to convert a rotational movement of a rotating shaft into the movement of the cutting torch along the track.

In one embodiment of the present invention, a sleeve having internal threads is rotatably connected to the cutting torch about an axis perpendicular to both a plane determined by the track and a longitudinal axis of the sleeve. A drive shaft is provided which has a free end and an end connected by means of a universal joint, to the rotating shaft. The drive shaft has external threads that threadingly engage the sleeve. The drive shaft is pivotable about an axis perpendicular to the plane of the track and extends through the universal joint. Thus, when the rotating shaft rotates the drive shaft through the universal joint, the sleeve moves along the drive shaft and causes the cutting torch to move along the track. The drive shaft may be rotated by a motor mounted to the frame.

The frame may be movable along a path parallel to the longitudinal axis of the steel and include clamping means for releasably clamping the steel between the frames in a position in which a longitudinal axis of the steel is perpendicular to the plane determined by the track. Thus the cutting torch is moved together with the steel when, for example, the steel is a continuous cast strand exiting a caster.

In another embodiment of the invention, a rack and a pinion are provided to replace the motor for converting the movement of the frame into the rotational movement of the rotating shaft. The rotating shaft in turn rotates the drive shaft through the universal joint, thereby causing the cutting torch to move along the track. The rack is mounted to a stationary support, such as a track for supporting and guiding the movable frame. The pinion is affixed to the rotating shaft and is adapted to rotate together with the rotating shaft, which is rotatably mounted to the frame.

In accordance with a further embodiment of the invention, a double acting fluid cylinder and pivoting linkage system serve as the drive mechanism. The cylinder is pivotally mounted to the frame about an axis perpendicular to the plane of the track and is also pivotally connected to the cutting torch about an axis, which is also perpendicular to the plane of the track. Therefore, the cylinder pivots about its mounting axis and the cutting torch is urged along the track when the cylinder is operated in either direction.

The present invention advantageously provides an alternative technology for cutting steel with a cutting torch while reducing slag adherence to the cut edge without using a secondary nozzle to inject a fluid stream for slag bead removal.

Other advantages and features of the present invention will be better understood with reference to preferred embodiments of the present invention described hereinafter.

BRIEF DESCRIPTION OF THE DRAWINGS

Having thus generally described the nature of the present invention, reference will now be made to the accompanying drawings, showing by way of illustration the preferred embodiments thereof, in which.

DETAILED DESCRIPTION OF THE PREFERRED EMBODIMENT

Figure 2:
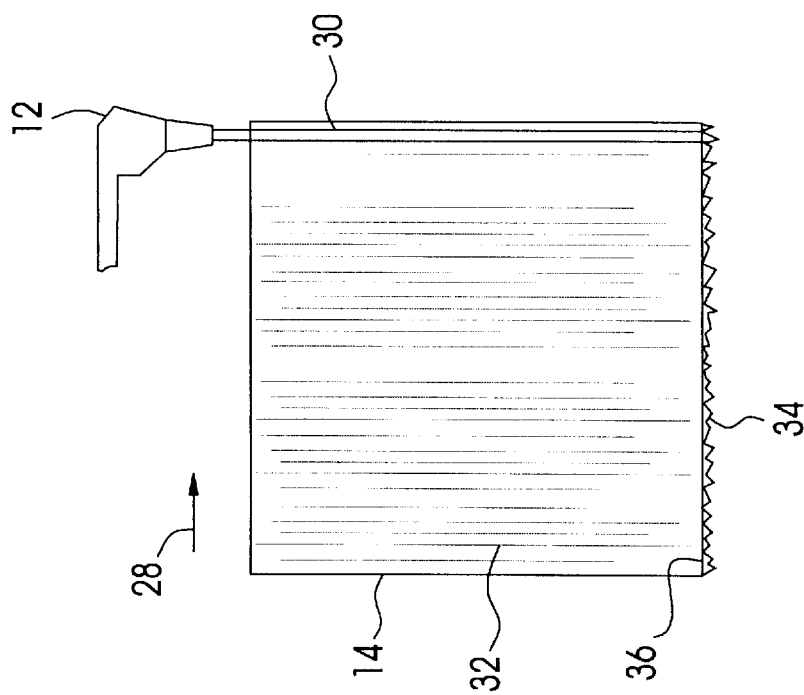
FIG. 2 is a general schematic illustration of a prior art method of cutting a still strand.
Figure 1:
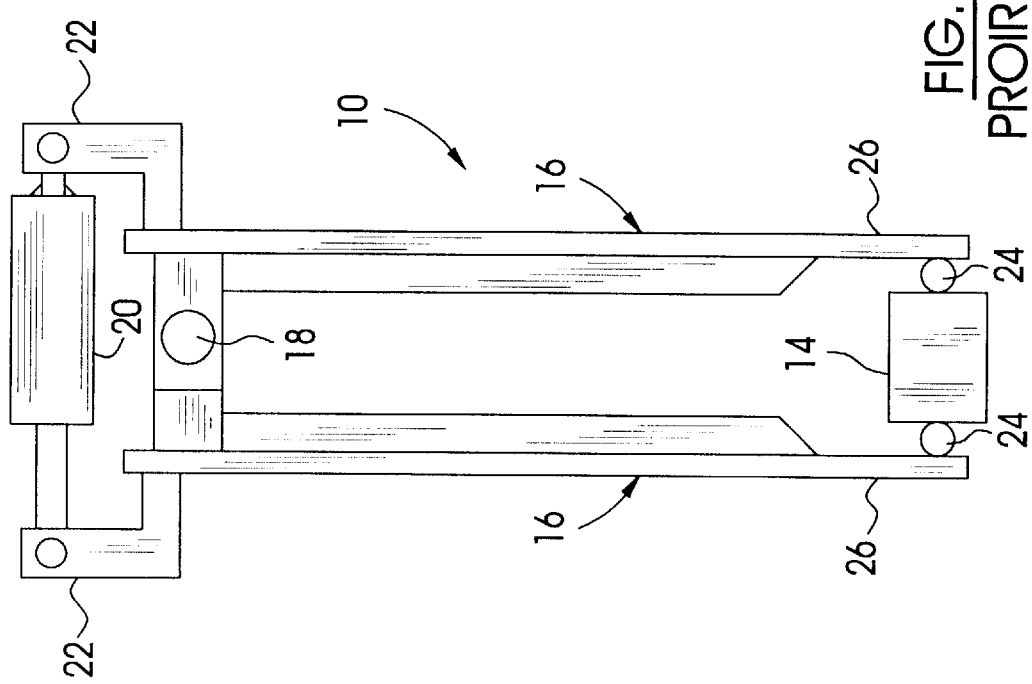
FIG. 1 is a front elevational view of a prior art apparatus for carrying a cutting torch to move with a continuous cast steel strand.

As shown in FIGS. 1 and 2, a conventional steel billet cutting apparatus 10 is adapted to mount a cutting torch 12 for movement with an advancing continuous steel strand 14 (reference numeral 14 hereinafter indicates either a steel strand, billet, bloom or small slab, whichever is appropriate) The apparatus 10 includes a pair of downwardly depending frames 16, which are pivotally connected together by a pivot pin 18 that act as a pair of clamp arms. A hydraulic cylinder 20 pivotally connects the respective upper ends 22 of the frames 16, in order to move clamping members 24 of the frames 16 into clamping engagement with vertical sides of the steel strand 14. The apparatus 10 is mounted for movement along a stationary guide track (not shown), which extends parallel to the longitudinal axis of the steel strand or billet 14. When the frames 16 clamp the steel strand 14 between the clamping members 24, the advancing steel strand 14 moves the apparatus 10 along the stationary guide track. A cutting torch 12, shown in FIG. 2, is movable transversely across the steel strand 14 as indicated by arrow 28 and thereby cuts the strand 14 into billets. The transverse movement of the torch 12 is driven by a drive mechanism (not shown), which is adapted to mount on the frames 16 of the apparatus 10, so that the apparatus and the attached cutting torch 12 are maintained in a fixed longitudinal position relative to the moving steel strand 14, so that the cutting torch is moved over the steel strand 14 to sever the billet.

As the cutting flame 30 cuts through the strand 14, as shown in FIG. 2, molten steel and iron oxide flow downwardly between the faces 32 (only one of which is shown in FIG. 2) of the steel that define a kerf produced by the cutting flame 30. Some of the molten material adheres to and forms slag beads 34 along the lower cut edges 36.

Figure 3:
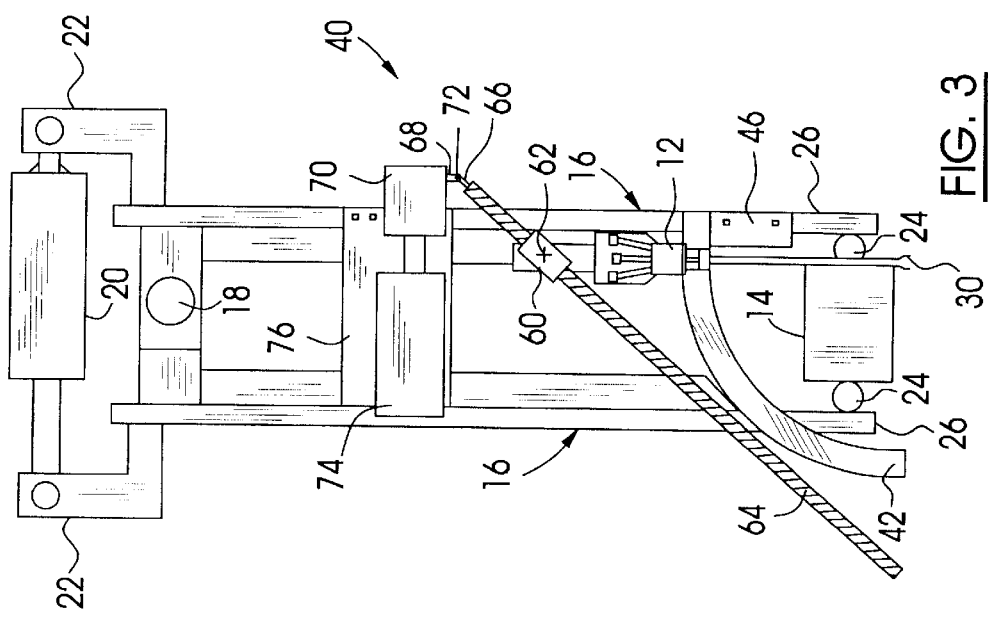
FIG. 3 is a front elevational view of a steel cutting apparatus incorporating a preferred embodiment of the invention.

FIG. 3 illustrates a steel billet cutting apparatus 40 in accordance with an embodiment of the invention. Apparatus 40 is mounted to the frame 16 shown in FIG. 1, the parts of which are indicated by the same reference numerals and are therefore not described. The apparatus 40 includes a track 42 forming an arcuate path 44, shown in FIG. 4. The track 42 is mounted at one end thereof by a mounting plate 46 to one of the frames 16, adjacent to the lower end 26 of the frame 16 and above the strand 14, which is clamped between the frames 16.

Figure 4:
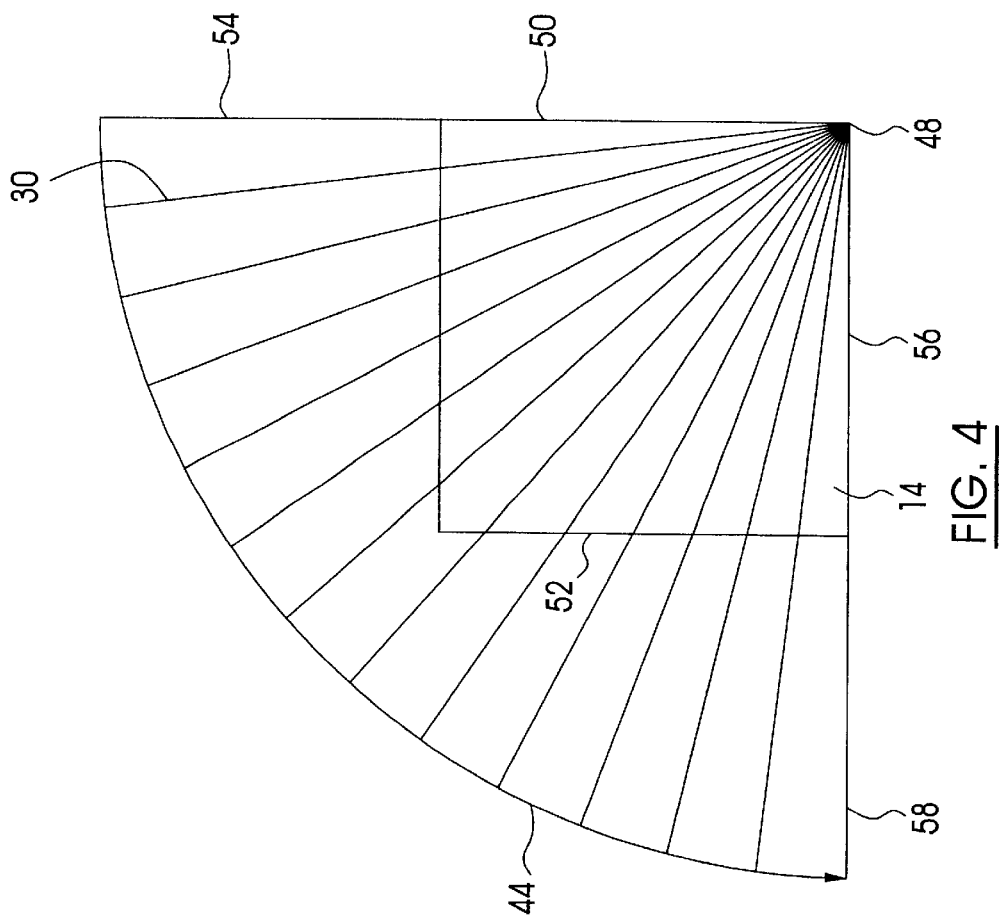
FIG. 4 is a schematic illustration of a steel cutting method in accordance with the invention.

As shown in FIG. 4, the arcuate path 44 formed by the track is generally one quarter of a circular path having its center located at a fixed point at which a cutting flame of the torch is continuously aimed. In this example, the center of the circular path is located at a right side, bottom corner 48 of the strand 14. The arcuate path 44 defines a plane perpendicular to a longitudinal axis of the strand 14. The cutting torch 12 (FIG. 3) includes a mechanism for guiding the cutting torch 12 along the track 42. For example, rollers (not shown) operatively engage the track 42. Thus, the cutting torch 12 is adapted to move, as shown in FIG. 4, from the right side 50 of the strand 14 to the left side 52, while gradually rotating from a first orientation 54 perpendicular to the bottom surface 56, to a second orientation 58 parallel to the bottom surface 56 of the strand 14, the bottom surface 56 extending along a horizontal plane. As the cutting torch 12 moves in the arcuate path 44, the cutting flame 30 is always aimed at the right side, bottom corner 48 of the strand 14 and the molten material thereby flows towards the right-side bottom corner 48. The rate of movement of the cutting torch 12 is dependent on a thickness of the steel, the characteristics of the cutting torch nozzle, the type of fuel and other factors well known in the art. The cutting torch 12 is preferably moved at a predetermined rate required to cut the steel most efficiently. Cutting the steel using this method results in a very small amount of slag forming on and adhering to the bottom corner 48 of the billet 14, rather than the significant amount that forms along the entire lower cut edge 56, as shown in FIG. 2.

Other steel products, for example, blooms and small slabs, which generally have rectangular or square cross-sections, can also be cut in this manner to reduce slag adherence. The apparatus 40 may also be used to cut steel that has a non-rectangular cross-section. The cut can be effected by aiming the cutting flame 30 at a fixed point defined by a bottom corner of an imaginary square or rectangle drawn around the still. In certain instances, efficiency may be increased if the length of the arcuate path 44 is greater than one quarter of a circular arc, as will be understood by those skilled in the art. Interchangeable tracks 42 having different radiuses are preferably used to cut respective sizes of steel, in order to keep the path traveled by the cutting torch 12 as short as possible for any given cutting operation.

The cutting torch 12 is moved by a drive mechanism operatively connected to the cutting torch 12 and preferably mounted to the same frame 16 to which the track 42 is mounted. In the embodiment shown in FIG. 3, the drive mechanism includes a sleeve 60 having internal threads (not shown) rotatably connected to the cutting torch 12 at an axis indicated by a "+" 62. The axis 62 is positioned perpendicular to both the plane determined by the track 42 and a threaded axial bore through the sleeve 60. The drive mechanism further includes a drive shaft 64 having a free end and an end connected by means of a universal joint 66 to a rotation-output shaft 68 of a gear box 70. The drive shaft 64 has external threads for threadingly engaging the internal threads in the axial bore of the sleeve 60, so that rotation of the rotation-output shaft 68 moves the sleeve 60 along the drive shaft 64. As the sleeve 60 is moved along the drive shaft 64, the drive shaft 64 pivots about an axis 72 that extends through the universal joint 66. Movement of the sleeve 60 urges the cutting torch 12 along the track 42. The gear box 70 is coupled to an electric motor 74, which controllably reciprocates the cutting torch 12 along the track 42. The gear box 70 and the electric motor 74 are mounted to the frame 16 to which the track 42 is mounted by a mounting plate 76. The drive mechanism and the track 42 do not interfere with the clamping action of the frames 16 because they are mounted to only one side of the frames 16.

In operation, the apparatus 40 is moved along the guide track (not shown) to a predetermined start position while the hydraulic cylinder 22 is retracted to maintain the pair of frames 16 in an open position. A continuous steel strand 14 exiting from a caster (not shown) advances between the open frames 16. When a predetermined length of the steel strand 14 has advanced beyond a point aligned with the cutting torch 12, the hydraulic cylinder 20 is extended to close the pair of frames 16, thereby clamping the steel strand 14 between the two clamping members 24. At this stage, the cutting torch 12 is preferably positioned at a top end of the track 42 and is oriented substantially vertically, as shown in FIG. 3. The apparatus 40 moves forward with the continuous steel strand 14, and the electric motor 74 begins to rotate the drive shaft 64, thereby urging the cutting torch 12 along the track 42 while the cutting torch 12 is operated to produce a cutting flame 30, aimed at the right-side, bottom corner 48 of the steel strand 14 to begin the cutting operation. When the cutting operation is completed, the cutting torch 12 has reached the other end of the track 42, where it is oriented in a substantially horizontal position. The hydraulic cylinder 20 is again retracted to open the frames 16, and the apparatus 40 is moved back to the predetermined start position. Meanwhile, the electric motor 74 rotates the drive shaft 64 in the opposite direction, thereby moving the cutting torch 12 along the track 42 and back to its start position in preparation for the next cutting operation.

Figure 5:
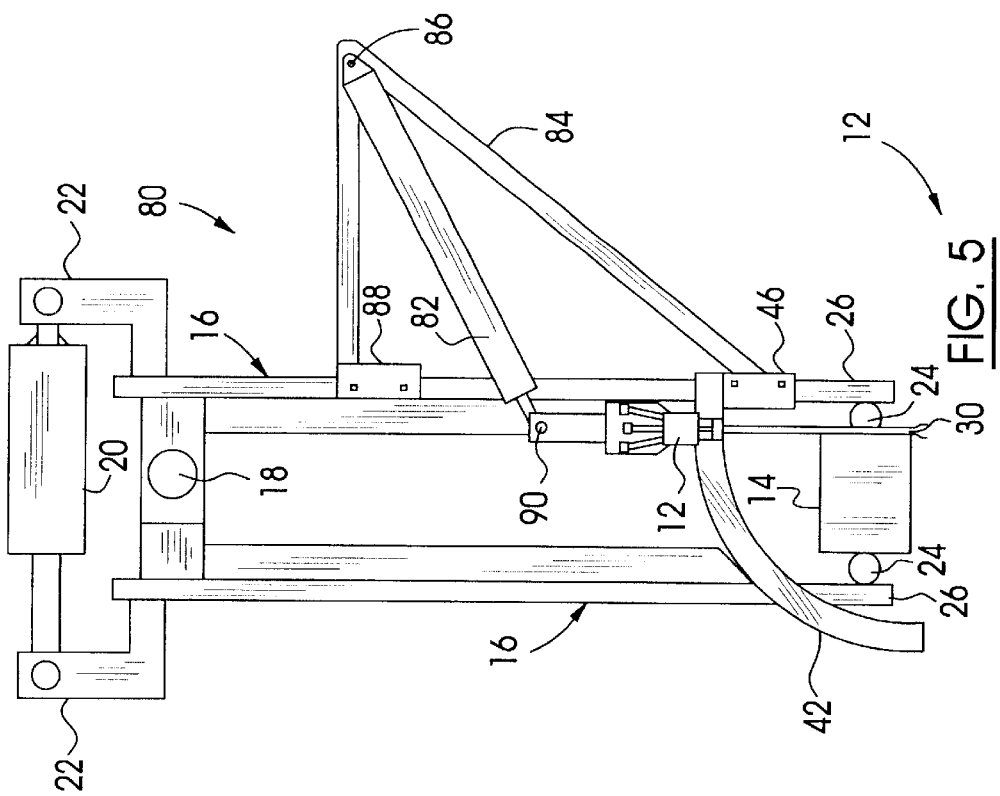
FIG. 5 is a front elevational view of a steel cutting apparatus in accordance with another embodiment of the present invention.

FIG. 5 illustrates another embodiment of the invention, in which a steel cutting apparatus 80 is similar to the apparatus 40, shown in FIG. 3. The parts of the apparatus 80 which are identical to those of apparatus 40 shown in FIG. 3 are indicated by the same reference numerals and are not described. A drive mechanism for the apparatus 80 includes a double acting fluid cylinder 82, which urges the cutting torch 12 along the track 42. The fluid cylinder 82 may be a pneumatic cylinder or a hydraulic cylinder. The cylinder 82 is pivotally connected to a support structure 84 about an axis 86 perpendicular to the plane determined by the track 42. The support structure 84 has a first leg mounted to a lower portion of the frame 16 and a second leg mounted to an upper portion of the same frame 16, for example, by a mounting plate 88. A ram of the cylinder 82 is pivotally mounted to the cutting torch 12 about an axis 90, which is perpendicular to the plane determined by track 42. When the cylinder 82 is operated to extend the ram, the cutting torch 12 is urged from the start position at the top end of the track 42, as shown in FIG. 5, to move along the track 42 to the end position, where it is disposed in a substantially horizontally, as described above. When the cylinder 82 is operated to retract the ram, the cutting torch 12 is moved back to the start position.

Figure 6:
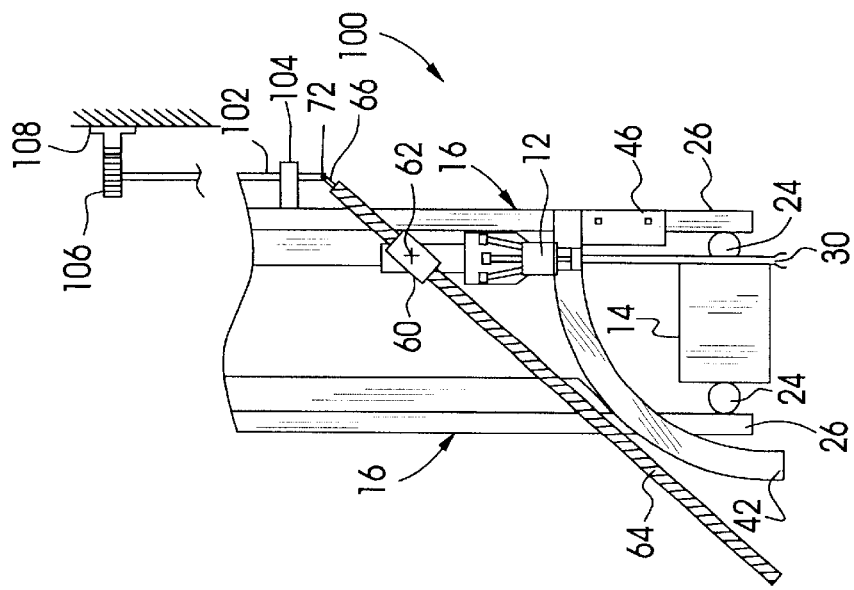
FIG. 6 is a partial front elevational view of a steel cutting apparatus in accordance with a further embodiment of the invention.

Another embodiment of the invention is schematically illustrated in FIG. 6, in which a steel cutting apparatus 100 is similar to the apparatus 40 shown in FIG. 3. The parts of the apparatus 100 which are identical to those of apparatus 40 shown in FIG. 3 are indicated by the same reference numerals and are not described. Some of the parts of the apparatus 10 shown in FIG. 1 are omitted from FIG. 6 in order to more clearly illustrate the differences between the apparatus 100 and apparatus 40. The drive mechanism of the apparatus 100 converts movement of the frames 16 along the guide track (not shown) into rotational movement of a rotating shaft 102, which is rotatably supported, for example, by one or more pillow blocks 104, on the frame 16 to which the track 42 is mounted. The rotating shaft is operatively connected to the drive shaft 64 by the universal joint 66. The gear box 70 (FIG. 3) may also be included in the drive mechanism. A pinion 106 is affixed to the rotating shaft 102 and is adapted to rotate together therewith. A rack 108 is mounted to a stationary support, which, for example, may be the guide track for the movement of the apparatus 10. The pinion 106 engages the rack 108 and rolls along the rack 108 as the apparatus 10 is moved along its guide track.

The rotational movement of the pinion 106, which drives the rotating shaft 102, rotates the drive shaft 64, so that the sleeve 60 is urged along the drive shaft 64, causing the cutting torch 12 to move along the track 42. As will be understood by those skilled in the art, a mounting linkage (not shown) may be required to keep the pinion 106 in engagement with the rack 108 when the frame 16 is released from the continuous strand 14 and returned to the start position. The mounting linkage may be incorporated into mounts for the rotating shaft 102 or the rack 108, or both.

As described above, after the cut is completed using the apparatus 100, the hydraulic cylinder 20 is retracted to release the clamping members 24 and the frame 16 is moved back to the starting position to begin another cut. As the frame 16 is moved back to the starting position, the linkage mechanism (not shown) keeps the pinion 106 engaged with the rack 108 and rotation of the rotating shaft 102 returns the torch 12 to the start position at the top of the guide track 42.

Modifications and improvements to the above-described embodiments of the invention may become apparent to those skilled in the art. For example, although the apparatus has been described with reference to the cutting of continuous cast strands, the apparatus described with reference to FIGS. 3 and 5 may likewise be used to cut stationary steel billets, slabs or beams. For stationary cutting applications, the apparatus 40,80 may be mounted to a stationary base and the steel to be cut may be moved into position under the guide track 42 using any one of many known heavy material manipulation mechanism. Alternatively, the apparatus 40,80 may be mounted to a mobile base that is rolled or driven into position over steel to be cut.

The foregoing description is therefore intended to be exemplary rather than limiting. The scope of the invention is therefore intended to be limited solely by the scope of the appended claims.

I claim:

1. An apparatus for cutting steel to reduce slag adherence to the steel, comprising a cutting torch and means for moving the cutting torch in an arcuate path from a first orientation in which the cutting flame is perpendicular to a horizontal plane extending along a bottom at a first side of the steel, to a second orientation in which the cutting flame is parallel to the horizontal plane extending along the bottom at the opposite side of the steel to ensure that a cutting flame of the cutting torch is continuously aimed at a fixed point at the bottom of the first side of the steel.

2. An apparatus as claimed in claim 1 wherein the means for moving comprises a track forming the arcuate path for guiding the cutting torch movement and a drive mechanism operatively connected to the cutting torch to move the cutting torch along the track.

3. Apparatus as claimed in claim 2 further comprising a frame for supporting the track and the drive mechanism.

4. An apparatus as claimed in claim 2 wherein the drive mechanism comprises a linkage system for converting a rotational movement of a rotating shaft into the movement of the cutting torch along the track.

5. An apparatus as claimed in claim 4 wherein the linkage system comprises:

a sleeve having an internally threaded axial bore connected to the cutting torch and rotatable about an axis perpendicular to both a plane determined by the track and the internally threaded axial bore;

a drive shaft having a free end and an end connected by a universal joint to the rotating shaft, the drive shaft including external threads for threadingly engaging the internally threaded axial bore through the sleeve, so that when the rotating shaft rotates the drive shaft, the sleeve is urged along the drive shaft and the drive shaft pivots about an axis that extends through the universal joint, thereby causing the cutting torch to move along the track.

6. An apparatus as claimed in claim 5 wherein the rotating shaft is rotated by a motor mounted to the frame.

7. An apparatus as claimed in claim 6 wherein the drive mechanism further comprises a gearbox connected between the motor and the rotating shaft.

8. An apparatus as claimed in claim 2 wherein the drive mechanism comprises a fluid cylinder pivotally mounted to the frame about an axis perpendicular to a plane determined by the track, the fluid cylinder being pivotally connected to the cutting torch so that when the fluid cylinder is operated, the fluid cylinder urges the cutting torch along the track.

9. An apparatus as claimed in claim 8 wherein the fluid cylinder is a pneumatic cylinder.

10. An apparatus as claimed in claim 8 wherein the fluid cylinder is a hydraulic cylinder.

11. An apparatus as claimed in claim 4 wherein the frame comprises means for releasably gripping the steel with a frame, in a position such that a longitudinal axis of the steel is perpendicular to the plane determined by the track.

12. An apparatus as claimed in claim 11 wherein the frame is movable along a path parallel to the longitudinal axis of the steel.

13. An apparatus as claimed in claim 9 wherein the drive mechanism comprises:

a rack and a pinion for converting the movement of the frame into the rotational movement of the rotating shaft, the rack being mounted to a stationary support and the pinion being affixed to the rotating shaft, which is rotatably mounted to the frame.

14. An apparatus for cutting a steel billet from a continuous cast steel strand to reduce slag adherence to cut edges of the steel billet, comprising a cutting torch and means for moving the cutting torch in an arcuate path from a first orientation at a first side of the steel strand in which the cutting flame is perpendicular to a bottom of the steel strand, to a second orientation at the opposite side of the steel strand in which the cutting flame is parallel to the bottom of the steel strand, to ensure that a cutting flame of the cutting torch is continuously aimed at a bottom corner of the first side of the steel strand until the steel billet is cut from the steel strand; and clamping members for engagement with veridical sides of the steel strand to move the apparatus along with the steel strand as the steel strand is continuously cast.

15. An apparatus as claimed in claim 14 wherein the means for moving the cutting torch comprises:

an arcuate track for supporting the cutting torch; and means for moving the cutting torch along the arcuate track at a predetermined rate required to cut the steel strand to form the steel billet.

* * * * *